US011106108B2

(12) United States Patent
Ozaki et al.

(10) Patent No.: US 11,106,108 B2
(45) Date of Patent: Aug. 31, 2021

(54) SEMICONDUCTOR MACH-ZEHNDER MODULATOR

(71) Applicant: NIPPON TELEGRAPH AND TELEPHONE CORPORATION, Tokyo (JP)

(72) Inventors: Josuke Ozaki, Atsugi (JP); Yoshihiro Ogiso, Atsugi (JP); Norihide Kashio, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 36 days.

(21) Appl. No.: 16/605,164

(22) PCT Filed: Apr. 17, 2018

(86) PCT No.: PCT/JP2018/015801
§ 371 (c)(1),
(2) Date: Oct. 14, 2019

(87) PCT Pub. No.: WO2018/194044
PCT Pub. Date: Oct. 25, 2018

(65) Prior Publication Data
US 2021/0103198 A1 Apr. 8, 2021

(30) Foreign Application Priority Data
Apr. 18, 2017 (JP) .............................. JP2017-082313

(51) Int. Cl.
*G02F 1/225* (2006.01)
*G02F 1/21* (2006.01)
*G02F 1/03* (2006.01)

(52) U.S. Cl.
CPC .......... *G02F 1/2257* (2013.01); *G02F 1/0316* (2013.01); *G02F 1/212* (2021.01)

(58) Field of Classification Search
CPC ............................... G02F 1/2257; G02F 1/212
See application file for complete search history.

(56) References Cited

U.S. PATENT DOCUMENTS

| 8,903,202 B1 | 12/2014 | Prosyk et al. |
| 10,180,588 B1 | 1/2019 | Lewen et al. |

(Continued)

FOREIGN PATENT DOCUMENTS

| CN | 103124923 A | 5/2013 |
| JP | 2012-78496 A | 4/2012 |

(Continued)

OTHER PUBLICATIONS

International Search Report dated Jun. 26, 2018, issued in PCT Application No. PCT/JP2018/015801, filed Apr. 17, 2018.

(Continued)

*Primary Examiner* — Omar R Rojas
(74) *Attorney, Agent, or Firm* — Workman Nydegger (57) ABSTRACT

A semiconductor MZM of the present invention includes the first and second signal electrodes formed to be parallel to the first and second arm waveguides, respectively; the first and second phase modulation electrodes that are branched from the first and second signal electrodes and that are provided on the first and second arm waveguides in a discrete manner along the first and second signal electrodes; the first and second ground electrodes formed parallelly along the first and second signal electrodes; and a plurality of connection wirings to connect the first and second ground electrodes between a plurality of points. A differential signal is inputted to or outputted from the first and second signal electrodes. The plurality of connection wirings adjacent to each other are arranged with an interval ¼ times smaller than wavelength of a signal propagated through the first and second signal electrodes.

8 Claims, 11 Drawing Sheets

(56) References Cited

U.S. PATENT DOCUMENTS

| | | | |
|---|---|---|---|
| 2013/0209023 A1* | 8/2013 | Prosyk | G02F 1/011 385/3 |
| 2013/0243364 A1 | 9/2013 | Kanno et al. | |
| 2015/0198859 A1 | 7/2015 | Chen | |
| 2015/0261059 A1* | 9/2015 | Yamazaki | G02F 1/035 385/3 |
| 2017/0227798 A1 | 8/2017 | Ishikawa et al. | |

FOREIGN PATENT DOCUMENTS

| | | |
|---|---|---|
| JP | 2015-148711 A | 8/2015 |
| JP | 2016-71241 A | 5/2016 |
| JP | 2017-3669 A | 1/2017 |
| JP | 2017-68163 A | 4/2017 |
| WO | 2014/050123 A1 | 4/2014 |

OTHER PUBLICATIONS

International Preliminary Report on Patentability dated Oct. 31, 2019, issued in PCT Application No. PCT/JP2018/015801, filed Apr. 17, 2018.

H. N. Klein et al., *1.55 μm Mach-Zehnder Modulators on InP for Optical 40/80 Gbit/s Transmission Networks*, OFC 2006, pp. 171-173.

Gregory Letal et al., *Low Loss InP C-Bank IQ Modulator with 40 GHz Bandwidth and 1.5V Vπ*, OFC 2015, Th4E.3.pdf, pp. 1-3.

L. Morl et al., *A Travelling Wave Electrode Mach-Zehnder 40 Gb/s Demultiplexer Based on Strain Compensated GaInAs/AlInAs Tunneling Barrier MQW Structure*, 10$^{th}$ International Conference on Indium Phosphide and Related Materials, May 11-15, 1998, pp. 403-406.

Taiwanese Office Action dated May 27, 2019, issued in Taiwanese Application No. 107112989.

* cited by examiner

PRIOR ART

SEMICONDUCTOR MACH-ZEHNDER MODULATOR

TECHNICAL FIELD

The present invention relates to a semiconductor Mach-Zehnder optical modulator to modulate an optical signal.

BACKGROUND ART

In order to satisfy an increasing demand for the communication traffic, a high-speed optical modulator for advanced optical modulation formats has been required. A multi-level optical modulator using a digital coherent technology is important to fabricate a transceiver having a high capacity exceeding 100 Gbps. These multi-level optical modulators are configured to include Mach-Zehnder optical modulators (hereinafter referred to as MZM) providing a zero chirp driving arranged in a parallel and multistage manner so as to add independent signals to optical amplitudes and phases, respectively. In recent years, a demand has been increasing for an optical transmitter having a smaller size and a lower driving voltage. Thus, research and developments have been actively made on the semiconductors MZM that can provide a smaller size and a lower driving voltage.

Figure 1A:
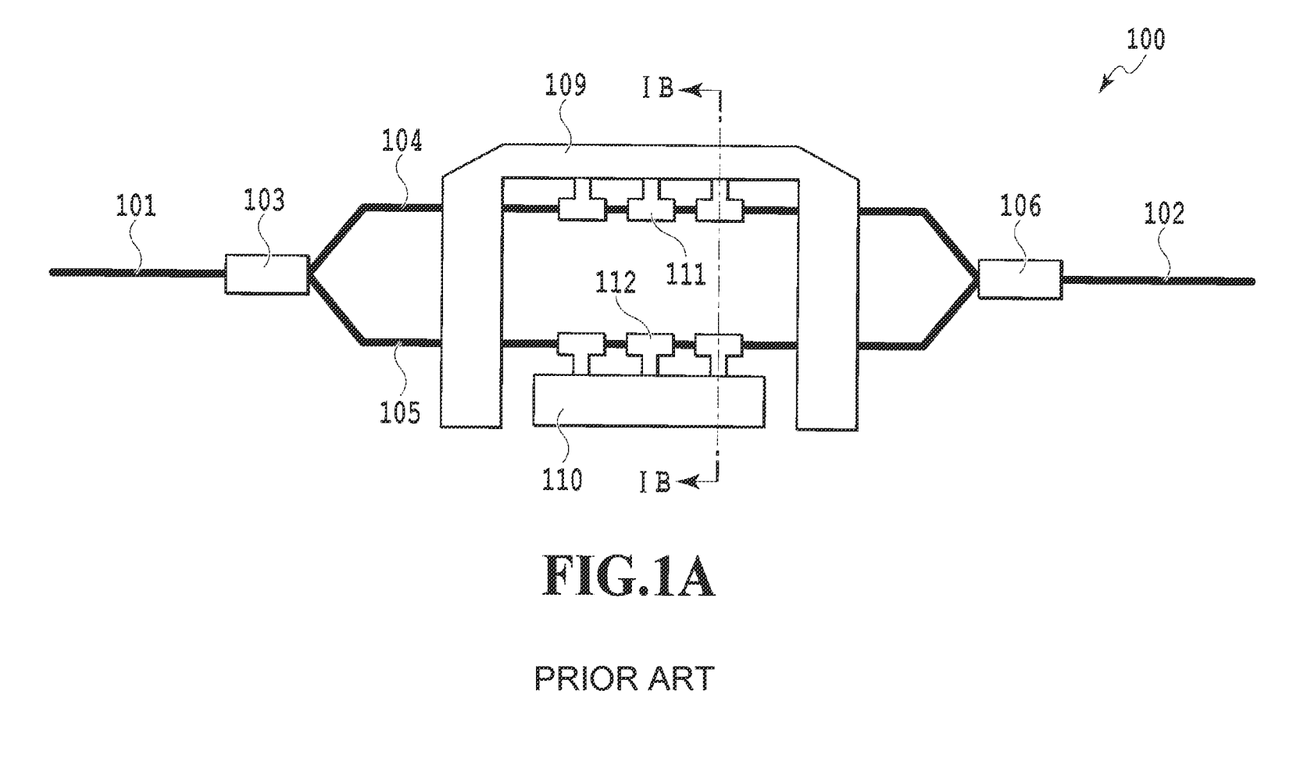
FIG. 1A is a diagram illustrating the configuration of a conventional semiconductor MZM.

FIG. 1A illustrates an example of a conventional semiconductor MZM as shown in NPL 1 and 2. FIG. 1A shows a semiconductor MZM 100 that includes: an input waveguide 101; an output waveguide 102; an optical demultiplexer 103 that branches a light wave wave-guided through the input waveguide 101 into two optical signals; first and second arm waveguides 104 and 105 that waveguides the two optical signals demultiplexed by the optical demultiplexer 103; an optical multiplexer 106 that multiplexes the optical signals wave-guided through the first and second arm waveguides 104 and 105, respectively, to output the resultant signals to the output waveguide 102; a first coplanar strip line 109; a second coplanar strip line 110; a first phase modulation electrode 111 that is branched from the first coplanar strip line 109 to be formed on the first arm waveguide 104; and a second phase modulation electrode 112 that is branched from the second coplanar strip line 110 to be formed on the second arm waveguide 105.

The semiconductor MZM 100 shown in FIG. 1A is configured so that a Mach-Zehnder interferometer is composed of the input waveguide 101, the output waveguide 102, the first and second arm waveguides 104 and 105, as well as the optical multiplexer 106. The semiconductor MZM 100 shown in FIG. 1A has a SG configuration in which, when one of the first and second coplanar strip lines 109 and 110 is connected to an input electrical signal potential (S), then the other of the first and second coplanar strip lines 109 and 110 is connected to a reference potential or a ground (G).

The semiconductor MZM 100 show in FIG. 1A is configured so that a voltage can be applied to the first and second arm waveguides 104 and 105 to thereby cause a change of the refractive index due to an electrooptic effect in a semiconductor core layer of the first and second arm waveguides 104 and 105. This can consequently provide a phase change of the light wave-guided through the first and second arm waveguides 104 and 105. The application voltage to the first and second arm waveguides 104 and 105 can be controlled to thereby adjust the interference status of the light multiplexed by the optical multiplexer 106. Thus, the output light in the output waveguide 102 can be ON/OFF-modulated.

Electrical signals propagated through the first and second coplanar strip lines 109 and 110 are applied to the first and second arm waveguides 104 and 105 via the first and second phase modulation electrodes 111 and 112, respectively. The first and second phase modulation electrodes 111 and 112 function as an electrode to apply a voltage to the first and second arm waveguides 104 and 105. Thus, the first and second phase modulation electrodes 111 and 112 form the entirety of a traveling waveelectrode including the first and second coplanar strip lines 109 and 110. For example, the semiconductor MZM 100 has a traveling wave electrode structure in which the respective optical signals waveguided through the first and second arm waveguides 104 and 105 have propagation speeds maximally matched with the propagation speed of the electrical signal propagated through the traveling waveelectrode to provide the phase matching between the former and the latter to thereby provide an increased modulation bandwidth.

An infinite modulation bandwidth can be obtained if there is no electrical signal loss and optical signals propagated through the first and second arm waveguides 104 and 105 have propagation speeds completely matched with the propagation speed of the traveling wave electrode. In an actual case however, the modulation bandwidth is limited because of the occurrence of an electrical signal loss or a phase shift.

The semiconductor MZM 100 shown in FIG. 1A has a so-called push-pull type configuration in which voltages inverted by 180 degrees to each other are applied to the first and second arm waveguides 104 and 105, which is designed by close to 50Ω. If the impedance deviates from 50Ω, an electric reflection is caused and prevents a voltage from being applied efficiently.

Figure 1B:
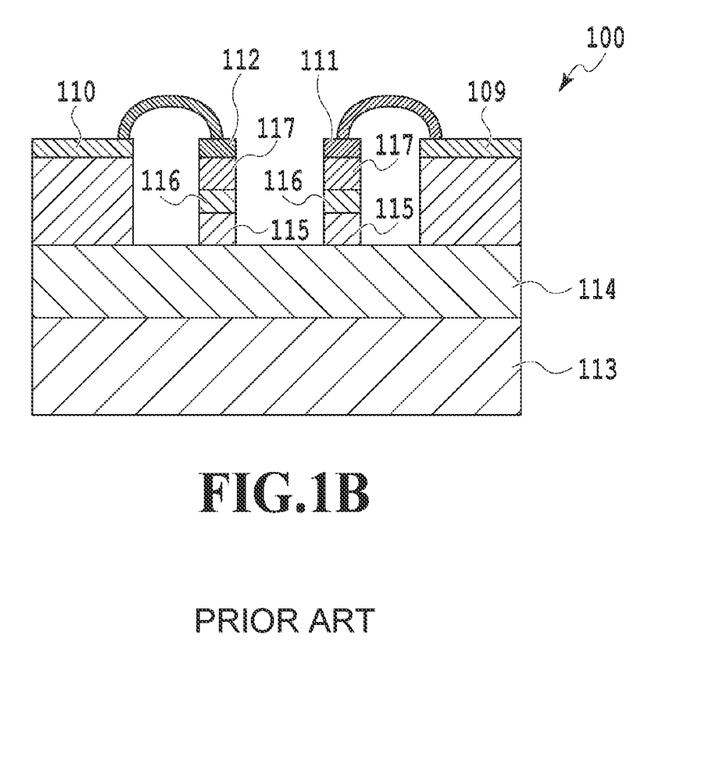
FIG. 1B is a diagram illustrating the configuration of the conventional semiconductor MZM.

FIG. 1B is a cross-sectional view of FIG. 1A taken along IB-IB. FIG. 1B shows an SI—InP substrate 113, an n-InP layer 114 formed on the SI—InP substrate 113, a lower clad layer 115 formed on the n-InP layer 114, a semiconductor core layer 116 through which optical signal is propagated, the semiconductor core layer 116 being formed on the lower clad layer 115, and an upper clad layer 117 formed on the semiconductor core layer 116. The semiconductor structure shown in FIG. 1B can function as an optical modulator by allowing electrical signals to be propagated through the first and second coplanar strip lines 109 and 110 to apply voltages to the semiconductor core layer 116 via the first and second phase modulation electrodes 111 and 112.

As shown in FIG. 1B, the first and second phase modulation electrodes 111 and 112 have, at the lower side thereof, the upper clad layer 117, the semiconductor core layer 116, and the lower clad layer 115, thus providing a fixed element capacity. For example, the semiconductor MZM 100 shown in FIG. 1A is configured so that the first and second phase modulation electrodes 111 and 112 apply capacities to the first and second coplanar strip lines 109 and 110, respectively. Specifically, the capacitance can be freely designed by optimally designing the number of the first and second phase modulation electrodes 111, 112, their spacing, and the contact length to the waveguide.

In the case of the traveling wave electrode structure, it is important, in order to determine the MZ modulator of the traveling wave electrode structure, to achieve the impedance matching and the speed matching between an optical signal and an electrical signal in an optical modulator. A general electrical signal transmission line model has an impedance z0 and a propagation coefficient γ represented by the following (Formula 1) and (Formula 2), respectively.

$$Z_0 = \sqrt{\frac{R + j\omega L}{G + j\omega C}} \qquad \text{Formula 1}$$

$$\gamma = \sqrt{(R + j\omega L)(G + j\omega C)} \qquad \text{Formula 2}$$

In the formulae, w denotes an angular frequency of an electrical signal, R denotes the resistance per a unit length of the transmission line, G denotes the conductance of the transmission line, L denotes the inductance of the transmission line, and C denotes the capacitance of the transmission line. When $\omega L \gg R$ and $\omega C \gg G$ are established, the impedance $z_0$ and the propagation coefficient $\gamma$ can be represented by the following (Formula 3) and (Formula 4), respectively.

$$Z_0 \approx \sqrt{\frac{L}{C}} \qquad \text{Formula 3}$$

$$\gamma \approx j\omega\sqrt{LC} \qquad \text{Formula 4}$$

Then, the electrical signal has a propagation speed v and an effective refractive index n that can be represented by the following (Formula 5) and (Formula 6), respectively, when assuming that the light velocity is "c".

$$v \approx \frac{1}{\sqrt{LC}} \qquad \text{Formula 5}$$

$$n \approx c\sqrt{LC} \qquad \text{Formula 6}$$

This model also can be applied to the traveling wave electrode. Specifically, it is shown that the impedance z0 and the electric signal propagation speed v can be adjusted by qualitatively controlling the capacitance component of the optical modulator. For example, the conventional MZM 100 shown in FIG. 1A is configured so that the first and second phase modulation electrodes 111 and 112 is used as a capacity to adjust the impedance $z_0$ and the electrical signal propagation speed v.

A frequency bandwidth Δf, which is caused by a velocity mismatch between an optical signal and an electrical signal, is represented by the following (Formula 7) using the group velocity $v_0$ of an optical signal propagated through the optical waveguide and an electrode length l.

$$\Delta f \approx \frac{1.4c}{\pi \left| \frac{1}{v_0} - \frac{1}{v} \right| 1} \qquad \text{Formula 7}$$

As can be seen from the above (Formula 7), the maximum frequency bandwidth Δf can be obtained when the optical signal group velocity $v_0$ is equal to the electrical signal propagation speed v. It is noted that the (Formula 7) is an approximation formula when there is no propagation loss and the impedance matching is achieved. Thus, Δf is actually influenced significantly by the propagation loss and the impedance matching.

As described above, by designing the optimal amount of an optimal capacity to be applied, the velocity matching between an optical signal and an electrical signal can be improved and the impedance matching to 50Ω can be also achieved, thus consequently providing the modulation at a high speed.

CITATION LIST

Patent Literature

[PTL 1] The specification of U.S. Pat. No. 8,903,202

Non-Patent Literature

[NPL 1] L. Moerl et al., "A travelling wave electrode Mach-Zehnder 40 Gb/s demultiplexer based on strain compensated GaInAs/AlInAs tunnelling barrier MQW structure," 1998 International Conference on Indium Phosphide and Related Materials, pp. 403-406, 1998

[NPL 2] H. N. Klein et al., "1.55 μm Mach-Zehnder Modulators on InP for optical 40/80 Gbit/s transmission networks," OFC2006, pp. 171-173

[NPL 3] G. Letal et al., "Low Loss InP C-B and IQ Modulator with 40 GHz Bandwidth and 1.5V Vπ," OFC2015, Th4E.3

SUMMARY OF INVENTION

However, in the case of the conventional MZM 100 shown in FIG. 1A and FIG. 1B, when two polarization multiplexing-type I/Q modulators in which semiconductor MZMs required for the multi-level modulation formats are parallelly integrated in one chip, an crosstalk caused between the two polarization multiplexing-type I/Q modulators increases. Thus, there is a disadvantage that crosstalk between two I/Q modulators is large and it is difficult to be them closely. Therefore, in the past, a two-chip configuration in which a chip is divided for each polarization as shown in NPL3 was used.

It is an objective of the present invention to provide a high-bandwidth semiconductor MZM that realizes a high-speed modulation by achieving the impedance matching and the speed matching between an electrical signal and an optical signal by the capacity loading structure and that can solve the conventional disadvantage of the crosstalk between the two polarization multiplexing-type I/Q modulators.

The semiconductor MZM according to one embodiment of the present invention is a semiconductor Mach-Zehnder optical modulator, comprising: an input waveguide; an optical demultiplexer for demultiplexing light inputted from the input waveguide; first and second arm waveguides for wave-guiding the light demultiplexed by the optical demultiplexer; an optical multiplexer for multiplexing the light wave-guided through the first and second arm waveguides, respectively; and an output waveguide for outputting the light demultiplexed by the optical demultiplexer. The first and second arm waveguides have a waveguide structure in which a semiconductor substrate has thereon a first conductive semiconductor clad layer, a non-doped semiconductor core layer, and a second conductive semiconductor clad layer formed by being layered consecutively. The semiconductor Mach-Zehnder optical modulator includes: a first signal electrode formed in parallel with the first arm waveguide; a second signal electrode formed in parallel with the second arm waveguide; a plurality of first phase modulation electrodes that are branched from the first signal electrode and that are provided on the first arm waveguide in a discrete manner along the first signal electrode; a plurality of second phase modulation electrodes that are branched from the second signal electrode and that are provided on the second arm waveguide in a discrete manner along the second signal electrode; a first ground electrode parallelly provided along the first signal electrode; a second ground electrode parallelly provided along the second signal electrode; and a plurality of connection wirings to connect the first ground electrode and the second ground electrode among a plurality of points. A differential signal is inputted to or outputted from the first signal electrode and the second signal electrode. The plurality of connection wirings adjacent to one another are provided with an interval ¼ times or less smaller than the wavelength of a signal propagated through the first and second signal electrodes.

As described above, the semiconductor MZM according to one embodiment of the present invention provides a high-speed modulation by the impedance matching and the speed matching between an electrical signal and an optical signal using the capacity loading structure and can solve the disadvantageous crosstalk between two I/Q modulators of the conventional modulator. Thus, a small and low-cost polarization multiplexing I/Q modulator integrated on one chip can be provided according to which a stable differential transmission characteristic can be realized with a high bandwidth.

DESCRIPTION OF EMBODIMENTS

Illustrative Embodiment 1

Figure 2:
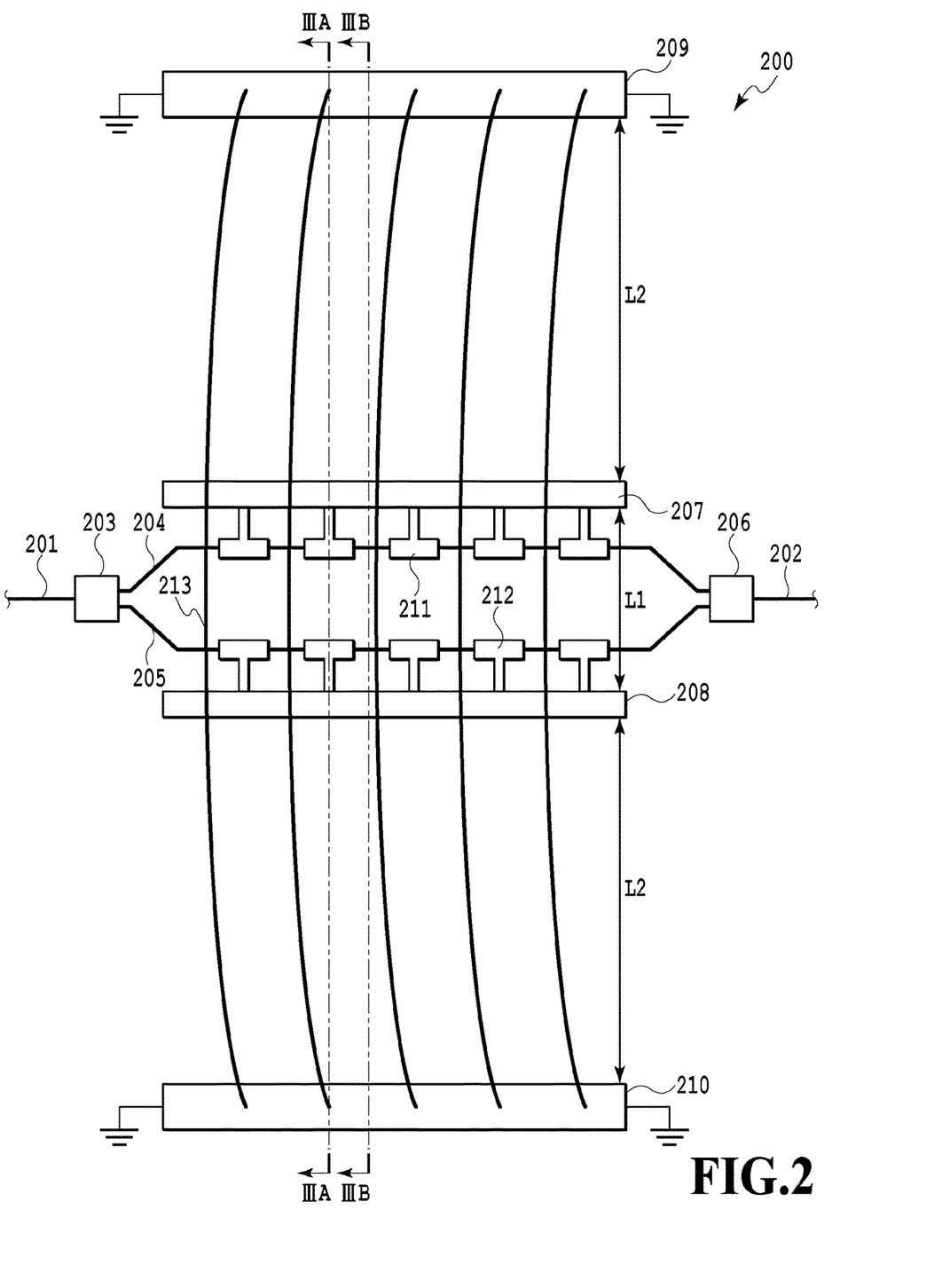
FIG. 2 is a diagram illustrating the configuration of a semiconductor MZM according to Illustrative Embodiment 1 of the present invention.

FIG. 2 illustrates the configuration of a semiconductor MZM 200 according to Illustrative Embodiment 1 of the present invention. FIG. 2 shows the semiconductor MZM 200 comprising: an input waveguide 201; an output waveguide 202; an optical demultiplexer 203 for demultiplexing a light wave wave-guided through the input waveguide 201 to two light waves; first and second arm waveguides 204 and 205 for wave-guiding the two demultiplexed light waves obtained through the optical demultiplexer 203, respectively; an optical demultiplexer 206 for demultiplexing the light waves wave-guided through the first and second arm waveguides 204 and 205, respectively, to output the resultant light waves to the output waveguide 202; a first signal electrode 207 formed in parallel with the first arm waveguide 204; a second signal electrode 208 formed in parallel with the second arm waveguide 205; a first ground electrode 209 parallelly formed along the first signal electrode 207; a second ground electrode 210 parallelly formed along the second signal electrode 208; a plurality of first phase modulation electrodes 211 that are branched from the first signal electrode 207 and that are provided on the first arm waveguide 204 in a discrete manner along the first signal electrode 207; a plurality of second phase modulation electrodes 212 that are branched from the second signal electrode 208 and that are provided on the second arm waveguide 205 in a discrete manner along the second signal electrode 208; and a plurality of connection wirings 213 to connect the first ground electrode 209 and the second ground electrode 210 among a plurality of points. Electrical signals applied to the first and second arm waveguides 204 and 205 are used to modulate the output light of the output waveguide 202. In Illustrative Embodiment 1, the connection wiring 213 can be a wire.

Figure 3A:
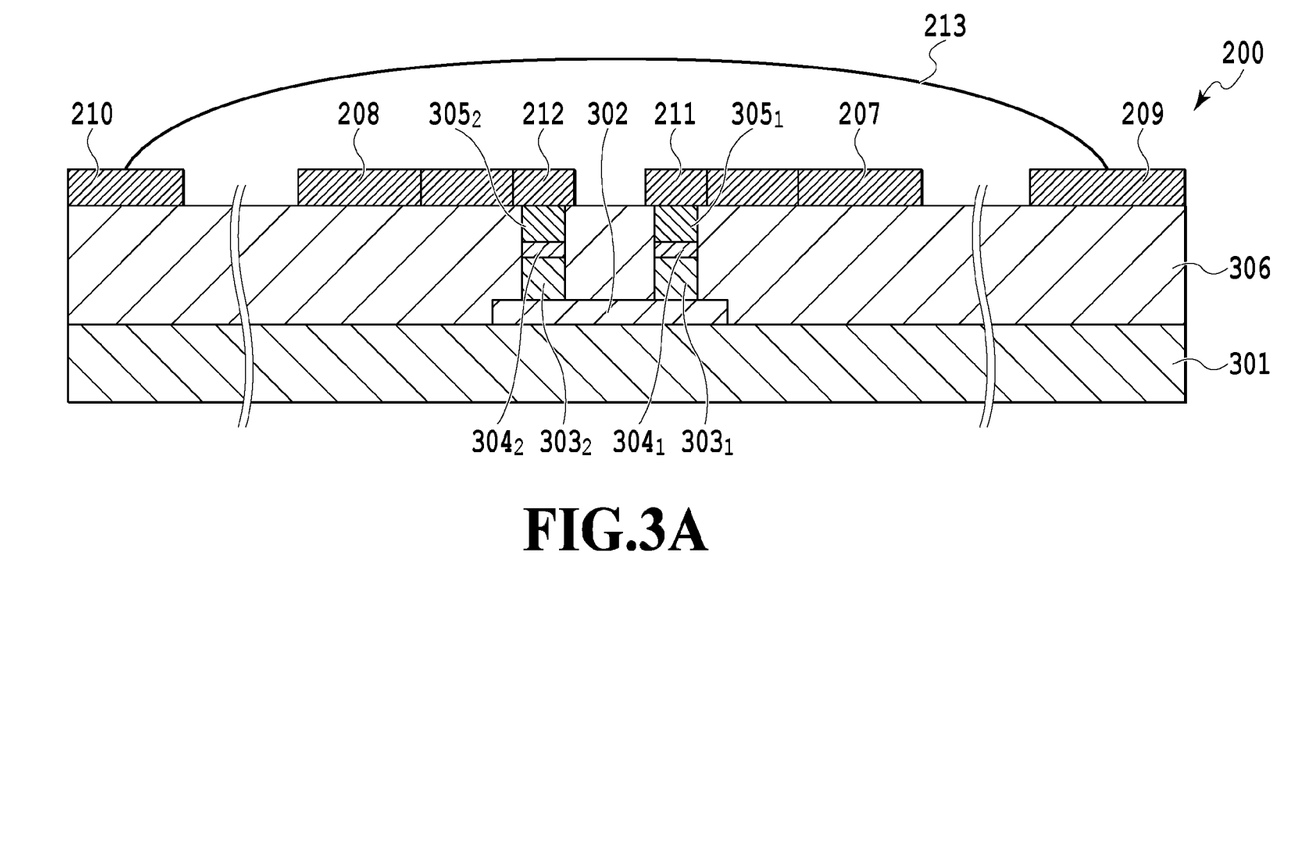
FIG. 3A is a cross-sectional view illustrating the semiconductor MZM according to Illustrative Embodiment 1 of the present invention.
Figure 3B:
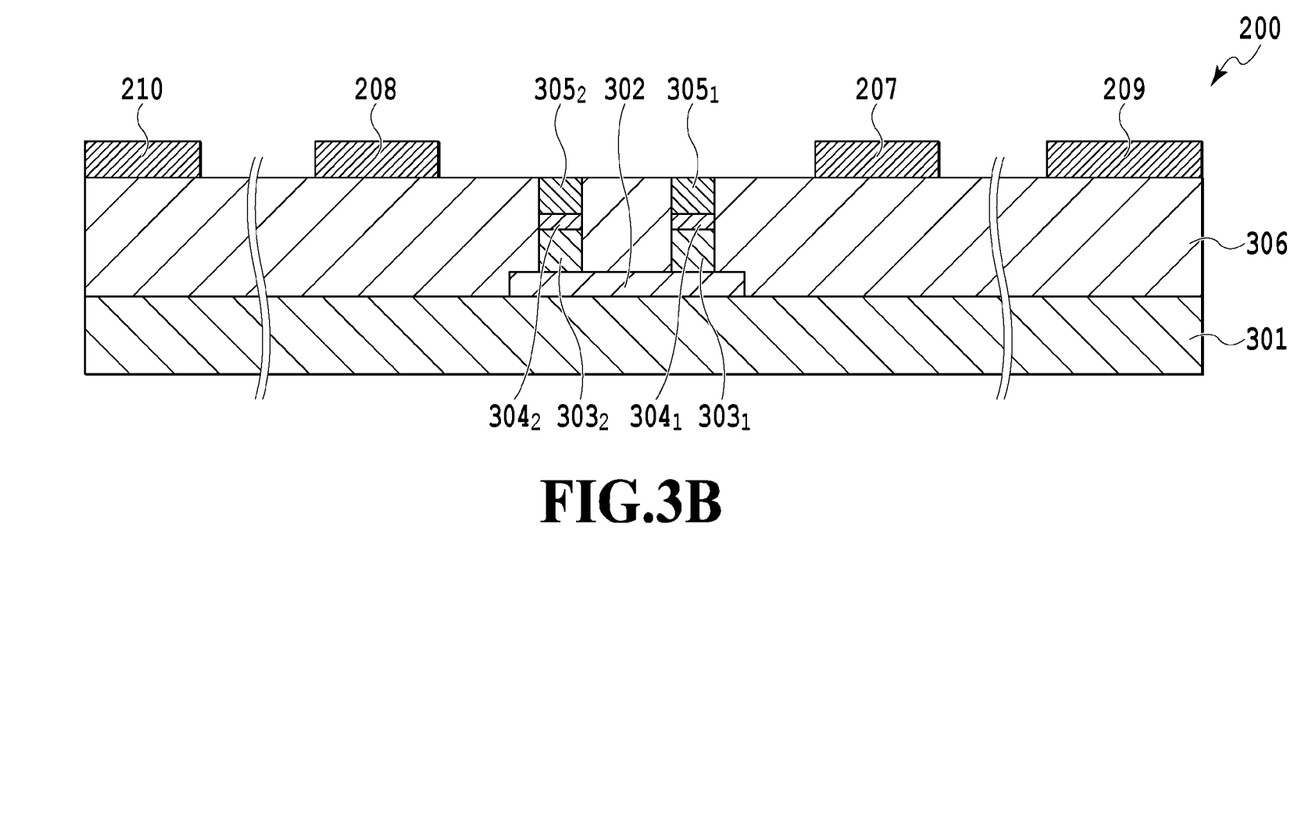
FIG. 3B is a cross-sectional view illustrating the semiconductor MZM according to Illustrative Embodiment 1 of the present invention.

FIG. 3A and FIG. 3B are a cross-sectional view taken along IIIA and IIIB of the semiconductor MZM 200 according to Illustrative Embodiment 1 of the present invention. FIG. 3A shows: an SI—InP substrate 301; an n-InP layer 302 formed on the SI—InP substrate 301; first and second lower clad layer 303 and 3032 formed on the n-InP layer 302; first and second semiconductor core layer 3041 and 3042 formed on the first and second lower clad layer 3031 and 3032, respectively; the first and second upper clad layer 3051 and 3052 formed on the first and second semiconductor core layer 3041 and 3042, respectively; a dielectric substance layer 306 formed on the SI—InP substrate 301 so as to embed these layers 301 to 305; first and second phase modulation electrodes 211 and 212 formed on the first and second upper clad layer 3051 and 3052, respectively; first and second signal electrodes 207 and 208 formed on the dielectric substance layer 306; the first and second ground electrodes 209 and 210; and a connection wiring 213 for connecting to the first and second ground electrodes 209 and 210.

The semiconductor MZM 200 according to Illustrative Embodiment 1 is configured so that the SI—InP substrate 301 has thereon the n-InP layer 302, the first and second lower clad layer 3031 and 3032 consisting of InP, the non-doped first and second semiconductor core layer 3041 and 3042, and the first and second upper clad layer 3051 and 3052 consisting of InP that are layered consecutively.

At least a part of the first and second semiconductor core layer 3041 and 3042 functions as an optical waveguide layer and can be configured by a material system such as InGaAsP or InGaAlAs to include a quaternary mixed crystal bulk layer having a single composition or a multiple quantum well layer. At least a part of the first and second semiconductor core layer 3041 and 3042 also can be configured by a structure having an optical confinement layer in which a multiple quantum well layer and the upper and lower sides thereof have a bandgap higher than that of the multiple quantum well layer and the bandgap has a value lower than those of the lower clad layer 303 and the upper clad layer 305. When the quaternary mixed crystal bulk layer or the multiple quantum well layer is used, the quaternary mixed crystal bulk layer or the multiple quantum well layer has a bandgap wavelength that can be set so that an effective electrooptic effect is obtained at the wavelength of light to be used and no problem is caused by optical absorption.

When the dielectric substance layer 306 is considered from the viewpoint of the characteristic, a desired impedance line is desirably made of polyimide such as organic material or low dielectric constant material such as BCB because such material can reduce the electrode loss.

The lower clad layer 303 and the upper clad layer 305 may be configured so that any of the former and the latter is composed of a n-type semiconductor and the other is composed of a p-type semiconductor. Another configuration also may be used in which the lower clad layer 303 and the upper clad layer 305 are both composed of a n-type semiconductor and the third p-type clad layer is further formed between the upper clad layer 305 and the semiconductor core layer 304 or between the lower clad layer 303 and the semiconductor core layer 304. The present invention is not limited to InP material and also may use a material system suitable for a GaAs substrate for example.

The semiconductor MZM 200 according to the present invention is configured so that a Mach-Zehnder interferometer is configured by the input waveguide 201, the output waveguide 202, the first and second arm waveguides 204 and 205, and the optical demultiplexer 206. The semiconductor MZM 200 according to the present invention has a GSSG (G:ground, S:signal) differential line (coplanar line) composed of the first and second signal electrodes 207 and 208 and the first and second ground electrodes 209 and 210. A differential signal is applied to the first and second signal electrodes 207 and 208. In contrast with the general GS single-phase line structure, Illustrative Embodiment 1 of the semiconductor MZM 200 according to the present invention uses a GSSG differential line design that can resist the crosstalk. From the viewpoint of the crosstalk, the electrode layout is desirably designed so that 2L1≤L2 is achieved when assuming that the difference between the first and second signal electrodes is L1 and the distance between a ground electrode and a signal electrode adjacent to each other is L2.

The first and second signal electrodes 207 and 208 allow electrical signals having phases inverted by 180 degrees to each other to propagate therethrough. Each of the electrical signals having propagated through the first and second signal electrodes 207 and 208 is branched to the first and second phase modulation electrodes 211 and 212 provided at a predetermined interval and the resultant signals are applied to the first and second arm waveguides 204 and 205. The first and second phase modulation electrodes 211 and 212 function as an electrode to apply a voltage to the first and second arm waveguides 204 and 205, respectively. Thus, a progressive wave type electrode is formed by the first and second phase modulation electrodes 211 and 212 together with the first and second signal electrodes 207 and 208 as well as the first and second ground electrodes 209 and 210. Specifically, the first and second phase modulation electrodes 211 and 212 apply a capacity to the first and second signal electrodes 207 and 208 as well as the first and second ground electrodes 209 and 210 that configure the GSSG differential line.

An amount of the capacity to be added can be freely designed by optimally designing the number of the first and second phase modulation electrodes 211 and 212, the interval, and the length. This provides the matching between the speed of light waves wave-guided through the first and second arm waveguides 204 and 205 and the speed of the electrical signal propagated through the progressive wave type electrode. In order to assume that the above electrodes 207 to 212 are a progressive wave type electrode, the electrodes 207 to 212 must be recognized as a distributed constant circuit. Thus, the interval between the first phase modulation electrodes 211 and the interval between the second phase modulation electrodes 212 must be set to be ¼ times or smaller than (or ideally ⅛ times or smaller than) the wavelength of an electrical signal propagated through the first and second signal electrodes 207 and 208. Due to the periodic structure, a Bragg frequency also must be generally considered. However, the frequencies are higher than the above ones. Thus, this is not required to be considered so long as the above is satisfied.

In order to obtain a 50 GHz bandwidth for example, such an electrode structure may be designed so that a 50 GHz electrical signal as the maximum frequency can be propagated therethrough. In a free space, the 50 GHz electrical signal corresponds to a signal having a 6 mm wavelength. The matching between the optical signal speed of a semiconductor Mach-Zehnder optical modulator and an electrical signal requires the electrical signal to have an effective refractive index of about 3.3-4.0. Thus, the 50 GHz bandwidth requires the first and second phase modulation electrodes 211 and 212 to have intervals of 185 μm to 230 μm, respectively. A further-wider bandwidth can be obtained by reducing the interval between phase modulation electrodes adjacent to each other.

Figure 4:
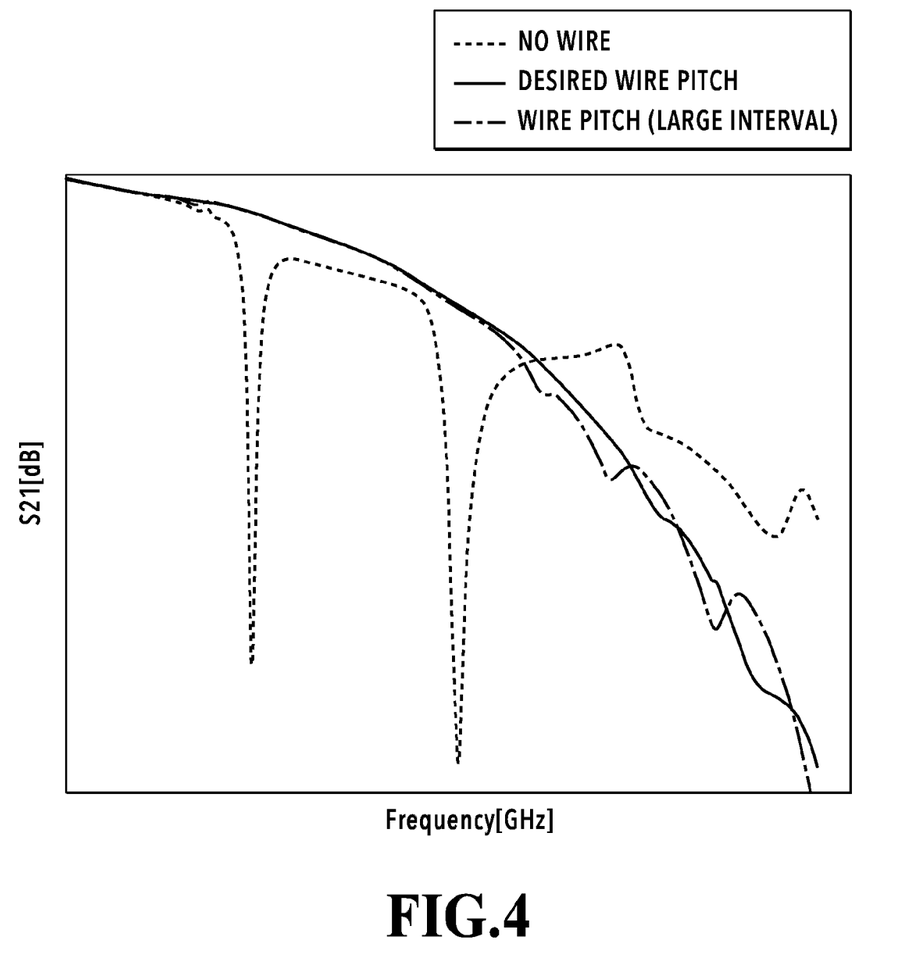
FIG. 4 illustrates the high frequency characteristic of an electrical signal by a connection wiring.

Next, the following section will describe, with reference to FIG. 4, the effect of the connection wiring 213 provides the connection between the first and second ground electrodes 209 and 210 shown in FIG. 2.

A differential signal is applied to the first and second signal electrodes 207 and 208. During the flow of current, a return current flows in the ground electrodes 209 and 210 at both ends. The first and second ground electrodes 209 and 210 at both ends are connected by the connection wiring 213 with a predetermined interval and thus have the same potential (ground potential). This can consequently prevent the ground resonance at an arbitrary frequency. When there is no connection wiring 213, the first and second ground electrodes 209 and 210 have a potential difference at a specific frequency for example, thus undesirably causing a ground resonance.

FIG. 4 illustrates the high frequency characteristic of an electrical signal depending on the nonexistence or existence of the connection wiring 213. As shown in FIG. 4, when the first and second ground electrodes 209 and 210 are not connected by the connection wiring 213 (no wire), the first and second ground electrodes 209 and 210 undesirably have electrical signals having an unstable frequency characteristic. Thus, at an arbitrary frequency depending in the propagation length, an undesirable resonance occurs in the first and second ground electrodes 209 and 210, which causes adverse effects such as a deteriorated waveform quality during the modulation or an increased crosstalk in transmitted or received signals. Thus, in the case of "no wire", a modulator having a high bandwidth is difficult to be achieved.

In order to suppress this resonance, as in the interval sufficiently short relative to the wavelength of the electrical signal (i.e., the respective intervals of the first and second phase modulation electrodes 211 and 212), the first and second ground electrodes 209 and 210 are connected by the connection wiring 213 with an interval ¼ times or smaller than (or preferably ⅛ times or smaller than) the wavelength of an electrical signal propagated through the first and second signal electrodes 207 (a desired wire pitch in FIG. 4). This allows, as shown in FIG. 4, the electrical signal in the first and second ground electrodes 209 and 210 to have a stable frequency characteristic, thus suppressing the resonance of the first and second ground electrodes 209 and 210. Thus, a modulator having a high bandwidth can be realized by connecting the first and second ground electrodes 209 and 210 by the connection wiring 213 having the desired wire pitch.

When the connection wiring 213 is provided with an interval larger than the above interval (the wire pitch in FIG. 4 (large interval)) on the other hand, the result is that, as shown in FIG. 4, the ripple amount can be reduced but the resonance of the first and second ground electrodes 209 and 210 cannot be completely suppressed.

The configuration disclosed in PTL 1 additionally has, in order to stabilize the ground electrode, another stable ground electrode in addition to the ground electrode of the GSSG differential line. However, such an addition of another ground electrode requires a mounting labor to cause an increased cost and an increased chip size, which is disadvantageous. The method disclosed in PTL 1 causes an asymmetric structure that may disturb an in-phase mode characteristic causing noise, which is not preferred.

In contrast with this, a configuration as shown in Illustrative Embodiment 1 can eliminate the need for the addition of another ground electrode as shown in PTL 1 by connecting the first and second ground electrodes 209 and 210 by the connection wiring 213 with an interval ¼ times or smaller than (or preferably ⅛ times or smaller than) the wavelength of the electrical signal propagated through the first and second signal electrodes 207 and 208, thus preventing disadvantages such as an increased cost or an increased chip size. Furthermore, a symmetric structure can be obtained by merely connecting the first and second ground electrodes 209 and 210 by the connection wiring 213 with the predetermined interval, thus realizing a stable differential transmission characteristic. Thus, Illustrative Embodiment 1 can realize, when compared with the method shown in PTL 1, a polarization multiplexing IQ modulator that has a lower cost and a smaller size.

If the connection points of the connection wiring 213 for connecting the first and second ground electrodes 209 and 210 have positions significantly deviated in the left-and-right direction, then the potentials of the ground electrodes 209 and 210 cannot be stabilized or unitized, thus preventing the resonance suppression. Thus, this illustrative embodiment preferably uses a configuration in which a plurality of the connection wiring 213 connects the first and second ground electrodes 209 and 210 by connection points on substantially the same positions on the signal travelling direction axis in the first and second ground electrodes 209 and 210.

Figure 5:
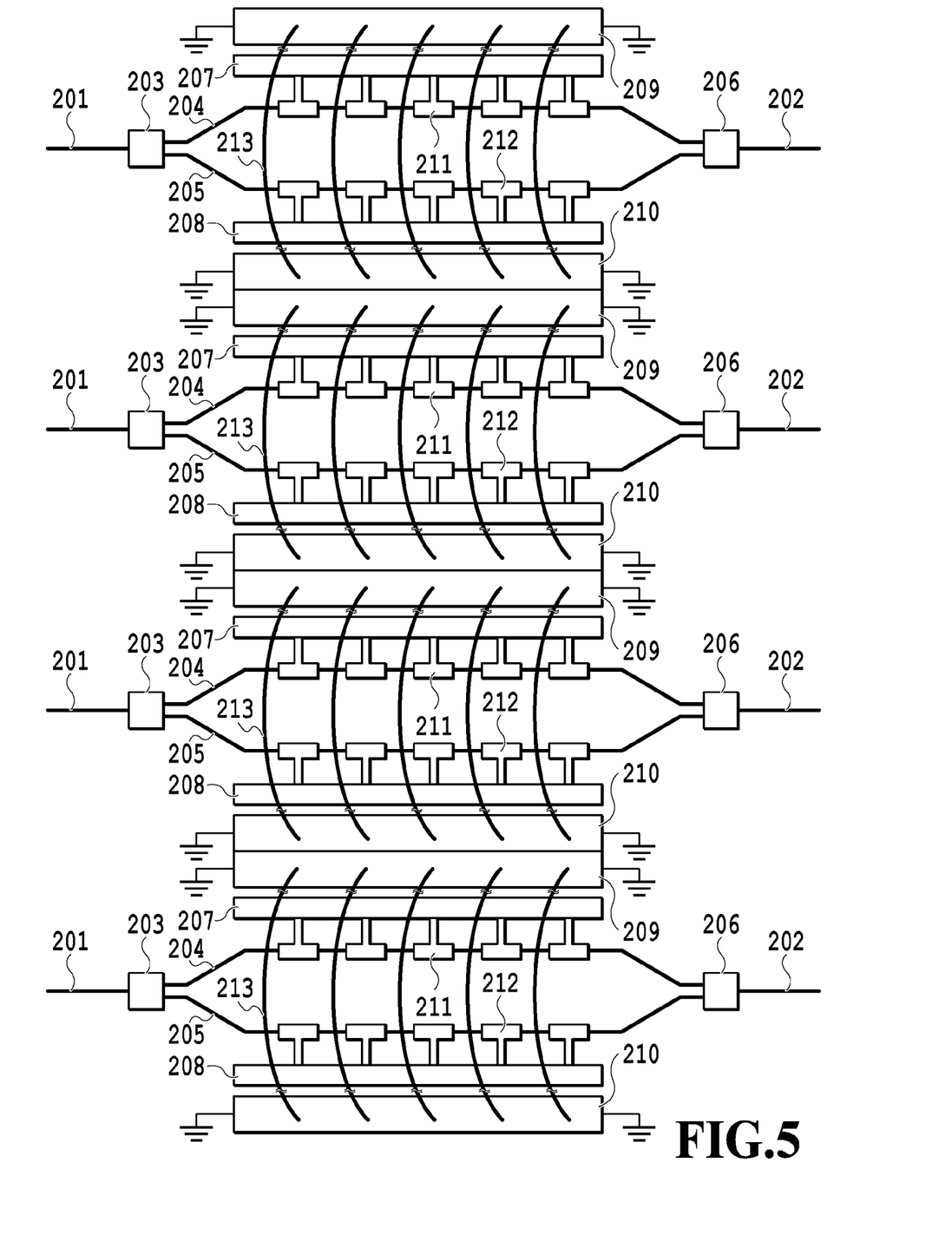
FIG. 5 illustrates a polarization multiplexing-type IQ modulator in which four MZMs according to Illustrative Embodiment 1 of the present invention are arranged in a parallel manner.

FIG. 5 illustrates a polarization multiplexing IQ modulator in which four MZMs according to Illustrative Embodiment 1 of the present invention are arranged in a parallel manner. As shown in FIG. 5, no ground electrode other than the first and second ground electrodes 209 and 210 is required, thus realizing a polarization multiplexing IQ modulator having a lower cost and a smaller size than in the case of the method shown in PTL 1.

In Illustrative Embodiment 1, five phase modulation electrodes 211 and five second phase modulation electrodes 212 are formed. However, the number of may be 1, 2, or more. An increase of the number of the first and second phase modulation electrodes 211 and 212 causes a proportional increase of the propagation loss of high frequency electrical signals, thus causing a tendency where the bandwidth is deteriorated. A trade-off relation is also caused according to which the driving voltage Vπ during the modulation may be reduced. Thus, the number of the first and second phase modulation electrodes 211 and 212 is desirably selected depending on a required modulation bandwidth. In order to provide a wider bandwidth, the first and second phase modulation electrodes 211 and 212 is preferably minimized. The positions of the first and second phase modulation electrodes 211 and 212 may have an asymmetric configuration in the up-and-down direction.

The cross-sectional views of FIG. 3A and FIG. 3B are exemplary. Thus, any cross-sectional shape may be used so long as the GSSG differential line configuration is used. For example, this illustrative embodiment uses configurations as shown in FIG. 3A and FIG. 3B in which the lower clad layer 303, the non-doped semiconductor core layer 304, and the upper clad layer 305 are consecutively layered to provide the same waveguide structure on every parts of the first and second arm waveguides 204 and 205 that have or do not have thereon the first and second phase modulation electrodes 211 and 212. However, the invention is not limited to this. Another configuration also may be used in which the non-doped semiconductor core layer 304 has thereon a non-doped semiconductor clad layer is formed on parts of the first and second arm waveguides 204 and 205 not having thereon the first and second phase modulation electrodes 211 and 212 so that different waveguide structures are provided to parts of the first and second arm waveguides 204 and 205 that have thereon the first and second phase modulation electrodes 211 and 212 and that do not have thereon the first and second phase modulation electrodes 211 and 212.

According to the present invention, by providing a capacity component to have an adjustable GSSG differential line configuration, the phase matching and the impedance matching can be satisfied to thereby realize a high-speed modulation. In addition, the strengthen coupling between signal electrodes around which ground electrodes are provided, thereby solving the disadvantage of the crosstalk due to the conventional structure. Thus, a plurality of semiconductor MZMs can be integrated without causing an increased chip size when compared with the conventional structure.

Illustrative Embodiment 2

Figure 6A:
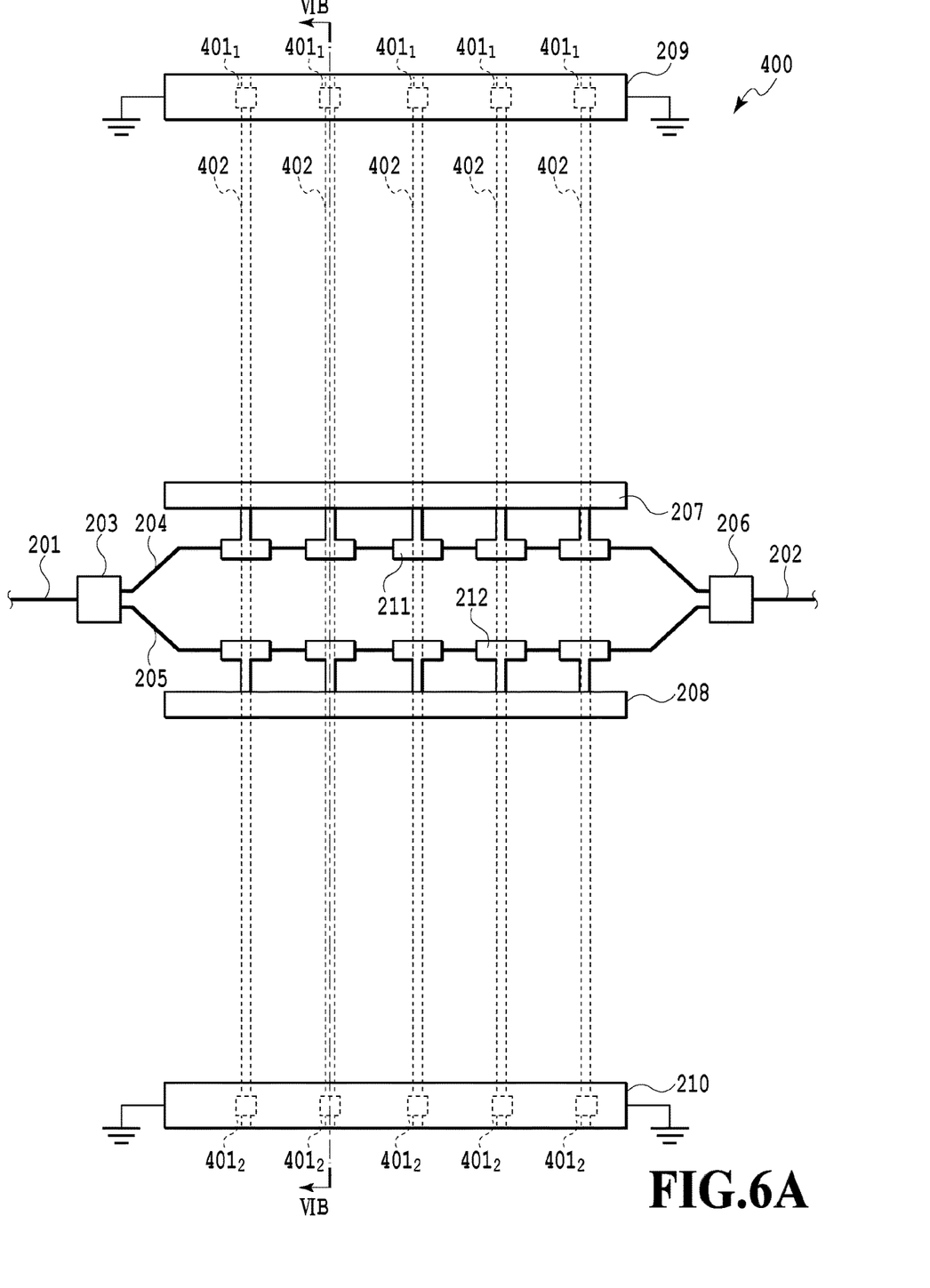
FIG. 6A illustrates the configuration of the semiconductor MZM according to Illustrative Embodiment 2 of the present invention.
Figure 6B:
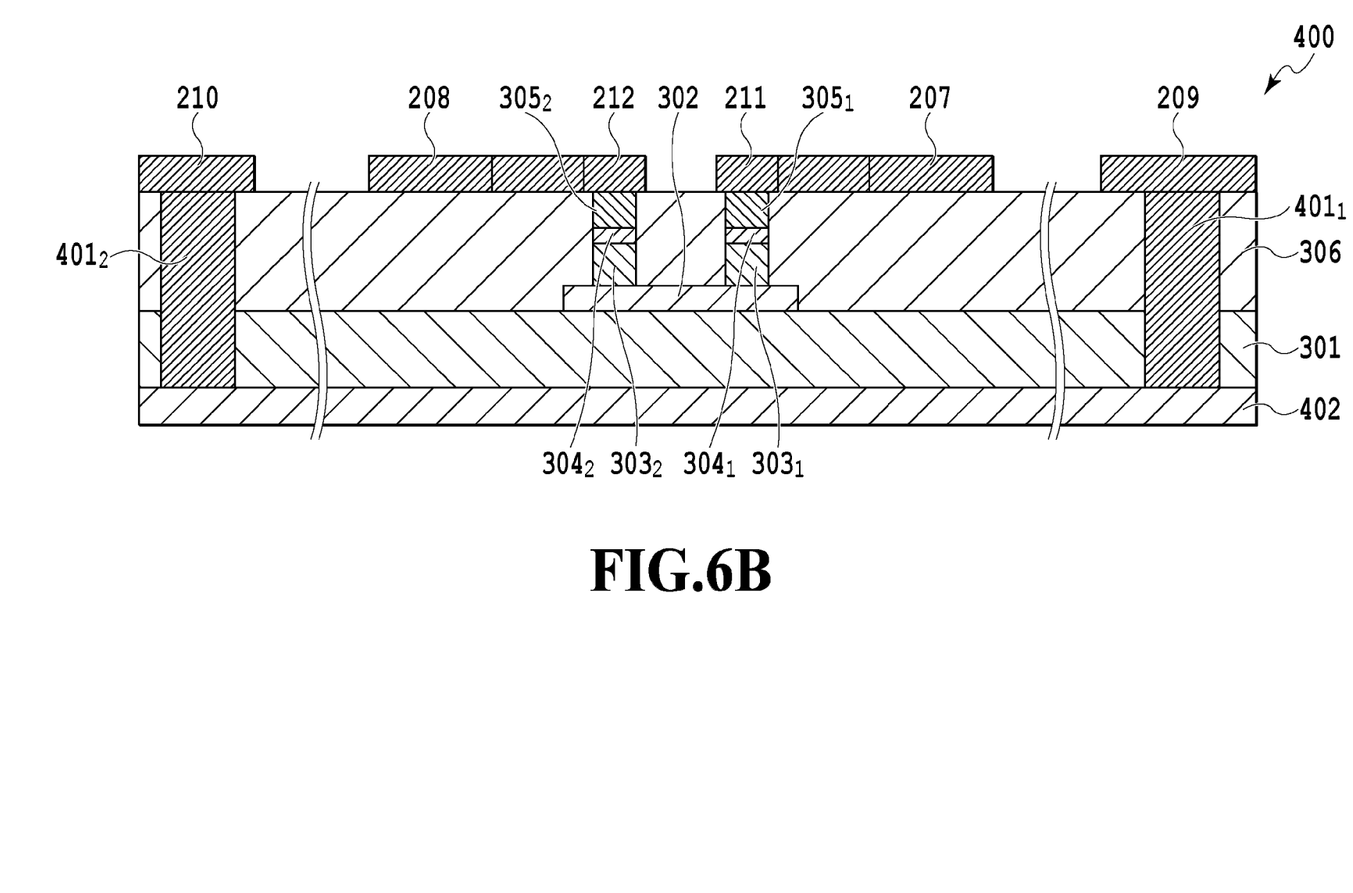
FIG. 6B illustrates one example of the cross-sectional view of the semiconductor MZM according to Illustrative Embodiment 2 of the present invention.

FIG. 6A illustrates the configuration of a semiconductor MZM 400 according to Illustrative Embodiment 2 of the present invention. FIG. 6B illustrates an example of the semiconductor MZM 400 according to Illustrative Embodiment 2 of the present invention taken along VIB. As shown in FIG. 6A and FIG. 6B, the semiconductor MZM 400 according to Illustrative Embodiment 2 of the present invention is configured so that the lower faces of the first and second ground electrodes 209 and 210 have thereon a plurality of the first and second vias 4011 and 4012. The back face of the SI—InP substrate 301 has thereon a plurality of back face ground electrodes 402 for connecting the first and second via 4011 and 4012. For example, the first and second ground electrodes 209 and 210 are connected by the plurality of back face ground electrodes 402 via a plurality of the first and second vias 4011 and 4012. The semiconductor MZM 400 according to Illustrative Embodiment 2 has the operation principle and the basic structure similar to those of Illustrative Embodiment 1 which will thus not be described further.

The semiconductor MZM 400 according to Illustrative Embodiment 2 of the present invention is different from the semiconductor MZM 200 according to Illustrative Embodiment 1 in that the connection wiring is not a wire but the plurality of stable back face ground electrodes 402 provided via a plurality of the first and second vias 401₁ and 401₂. In contrast with a wire, the plurality of the first and second vias 401₁ and 401₂ as well as the plurality of back face ground electrodes 402 can be prepared by a wafer process, thus providing a superior mass productivity to the semiconductor MZM 400 according to Illustrative Embodiment 2 of the present invention.

As in Illustrative Embodiment 1, the interval between the first vias 401₁ adjacent to each other and the interval between the second vias 401₂ adjacent to each other can be set to be ¼ times or smaller than (or preferably ⅛ times or smaller than) the wavelength of an electrical signal propagated through the first and second signal electrodes 207 and 208. The SI—InP substrate 301 has a thickness generally 200 μm or more that is sufficiently thicker than the distance between a ground electrode and a signal electrode and the distance between signal electrodes, thus allowing the plurality of back face ground electrodes 402 to have no influence on a characteristic such as the impedance matching or the speed matching.

The following section will briefly describe the method of manufacturing the semiconductor MZM 400 according to Illustrative Embodiment 2 of the present invention. In the configurations shown in FIG. 2, FIG. 3A, and FIG. 3B, a general modulator structure not including the connection wiring 213 is prepared. Thereafter, a resist mask is used from the SI—InP substrate 301 side to process, at a part requiring the formation of a plurality of the first and second vias 401₁ and 401₂, the SI—InP substrate 301 and the dielectric substance layer 306 to thereby expose the first and second ground electrodes 209 and 210 at the upper face. Thereafter, a plating step is used to form a plurality of the first and second vias 401₁ and 401₂ as well as the plurality of back face ground electrodes 402. This can consequently manufacture the semiconductor MZM 400 according to Illustrative Embodiment 2 of the present invention.

Illustrative Embodiment 3

Figure 7A:
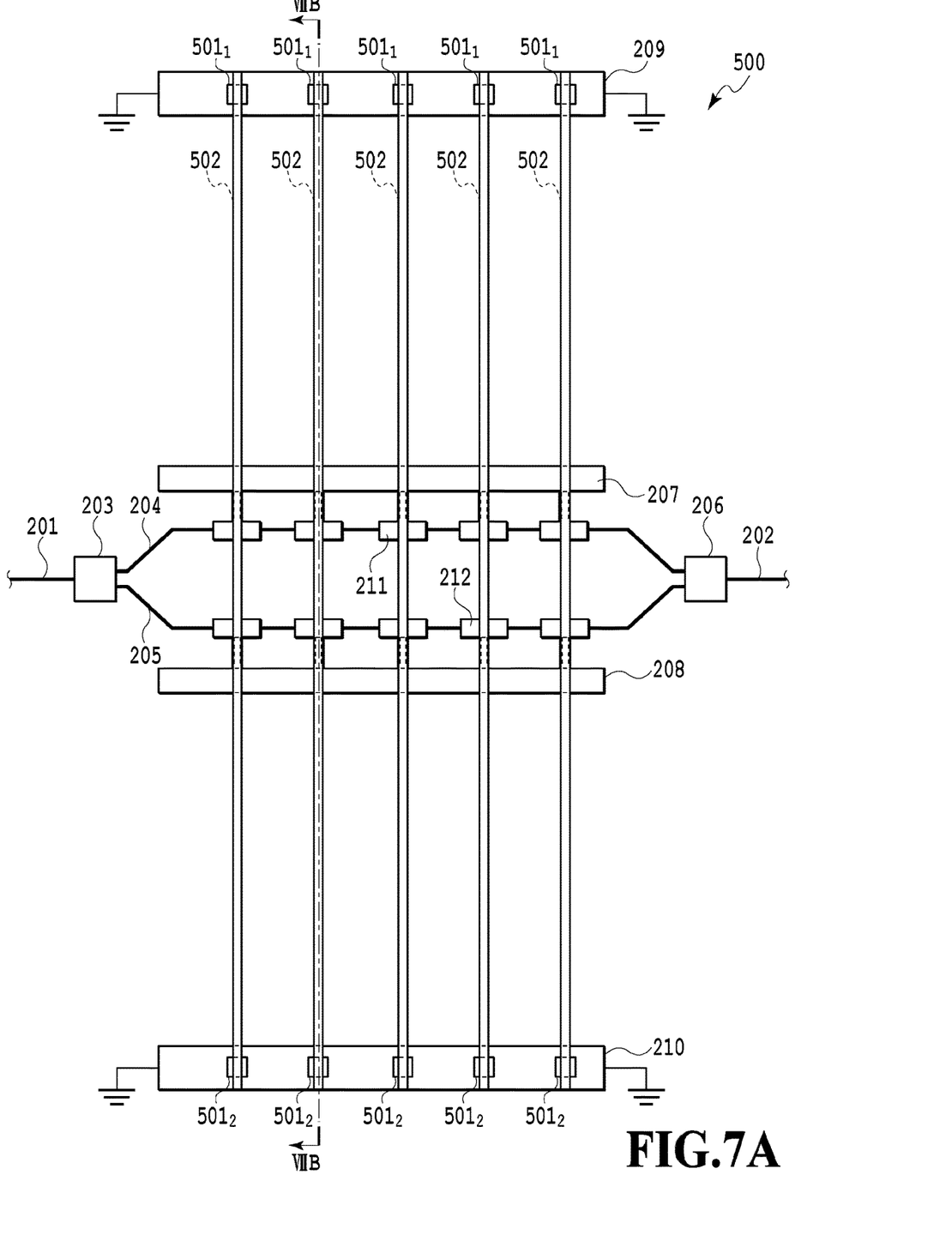
FIG. 7A illustrates the configuration of the semiconductor MZM according to Illustrative Embodiment 3 of the present invention.
Figure 7B:
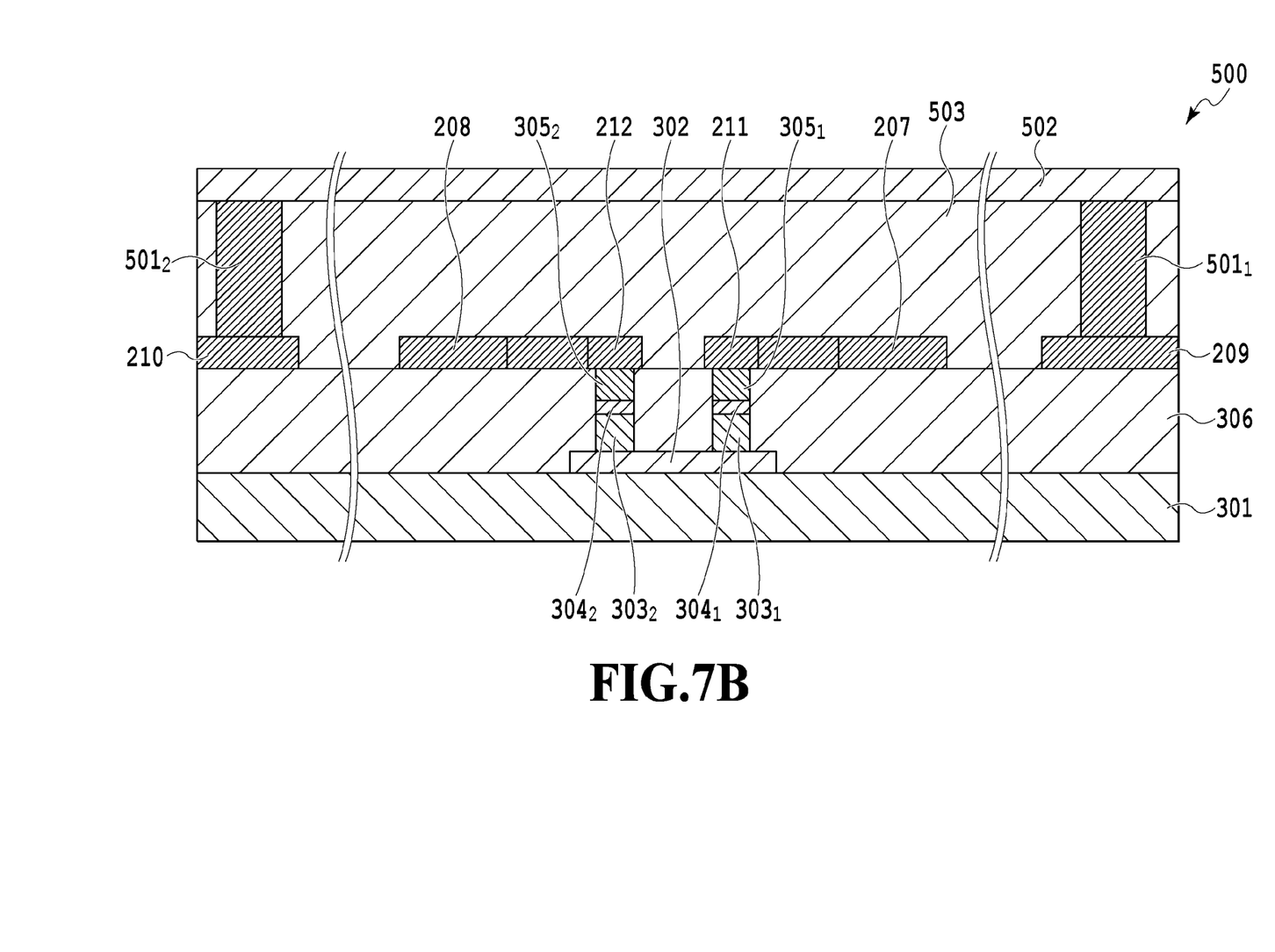
FIG. 7B illustrates one example of the cross-sectional view of the semiconductor MZM according to Illustrative Embodiment 3 of the present invention.

FIG. 7A illustrates the configuration of a semiconductor MZM 500 according to Illustrative Embodiment 3 of the present invention. FIG. 7B is a cross-sectional view illustrating an example of the semiconductor MZM 500 according to Illustrative Embodiment 3 of the present invention taken along VIIB. As shown in FIG. 7A and FIG. 7B, the semiconductor MZM 500 according to Illustrative Embodiment 3 of the present invention is configured so that the upper faces of the first and second ground electrodes 209 and 210 include a plurality of the first and second vias 501₁ and 501₂. The first and second signal electrodes 207 and 208, the first and second ground electrodes 209 and 210, as well as a dielectric substance layer 503 formed so as to embed a plurality of the first and second vias 501₁ and 501₂ have thereon a plurality of upper face ground electrodes 502 to connect a plurality of the first and second vias 501₁ and 501₂, respectively. For example, the first and second ground electrodes 209 and 210 are connected by the upper face ground electrode 502 via a plurality of the first and second vias 501₁ and 501₂. The semiconductor MZM 500 according to Illustrative Embodiment 3 has the operation principle and the basic structure similar to those of Illustrative Embodiment 1 which will thus not be described further.

The semiconductor MZM 500 according to Illustrative Embodiment 3 is different from the MZMs according to Illustrative Embodiments 1 and 2 in that a chip surface has the plurality of upper face ground electrodes 502 to connect the first and second ground electrodes 209 and 210 via a plurality of the first and second vias 501₁ and 501₂. The plurality of the first and second vias 501₁ and 501₂ as well as the plurality of upper face ground electrodes 502 can be manufactured, in contrast with a wire, by a wafer process, thus allowing the semiconductor MZM 500 according to Illustrative Embodiment 3 of the present invention to have a superior mass productivity. Furthermore, in contrast with Illustrative Embodiment 2, the semiconductor MZM 500 according to Illustrative Embodiment 3 of the present invention does not need a step of manufacturing a back face ground electrode and thus can be manufactured easily.

When the upper face ground electrode 502 is manufactured so as to cover the entire face of the chip, the upper face ground electrode 502 can function as a shield. Thus, the semiconductor MZM 500 according to Illustrative Embodiment 3 of the present invention can provide such a characteristic that can more resist the crosstalk and noise. Furthermore, the impedance and the electrical signal propagation speed also can be minutely adjusted by forming the plurality of upper face ground electrodes 502 at an arbitrary interval.

The interval between the first vias 501₁ adjacent to each other and the interval between the second vias 501₂ adjacent to each other must be set, as in Illustrative Embodiment 1, to be ¼ times or smaller than (or preferably ⅛ times or smaller than) the wavelength of an electrical signal propagated through the first and second signal electrodes 207 and 208. If the distance between a signal line and the upper face ground electrode 502 is shorter than the distance between a ground electrode and the signal electrode and the distance between signal electrodes, then a significant deviation is undesirably caused between the impedance and the electrical signal speed. Thus, the distance between the signal line and the upper face ground electrode 502 must be set to be 2 times or more longer than the distance between the ground electrode and the signal electrode and the distance between signal electrodes.

Next, the following section will describe a method of manufacturing the semiconductor MZM 500 according to Illustrative Embodiment 3 of the present invention. In the configurations shown in FIG. 2, FIG. 3A, and FIG. 3B, a general modulator structure not including the connection wiring 213 is formed. Thereafter, a dielectric substance film is coated to prepare the dielectric substance layer 503 having an arbitrary height. Thereafter, a part of the dielectric substance layer 503 in which a plurality of the first and seconds via 501₁ and 501₂ are to be formed is etched to thereby etch the ground electrodes 209 and 210. Thereafter, a plating step is used to prepare the plurality of first and second vias 501₁ and 501₂ as well as the plurality of upper face ground electrodes 502.

The invention claimed is:

1. A semiconductor Mach-Zehnder optical modulator, comprising:
    an input waveguide; an optical demultiplexer for demultiplexing light inputted from the input waveguide; first and second arm waveguides for wave-guiding the light demultiplexed by the optical demultiplexer; an optical multiplexer for multiplexing the light wave-guided through the first and second arm waveguides, respectively; and an output waveguide for outputting the light demultiplexed by the optical demultiplexer, wherein the first and second arm waveguides have a waveguide structure in which a semiconductor substrate has thereon a first conductive semiconductor clad layer, a non-doped semiconductor core layer, and a second conductive semiconductor clad layer formed by being layered consecutively, the semiconductor Mach-Zehnder optical modulator comprising:

a first signal electrode formed in parallel with the first arm waveguide;

a second signal electrode formed in parallel with the second arm waveguide;

a plurality of first phase modulation electrodes that are branched from the first signal electrode and that are provided on the first arm waveguide in a discrete manner along the first signal electrode;

a plurality of second phase modulation electrodes that are branched from the second signal electrode and that are provided on the second arm waveguide in a discrete manner along the second signal electrode;

a first ground electrode parallelly provided along the first signal electrode;

a second ground electrode parallelly provided along the second signal electrode; and a plurality of connection wirings to connect the first ground electrode and the second ground electrode among a plurality of points, wherein:

a differential signal is inputted to or outputted from the first signal electrode and the second signal electrode, and the plurality of connection wirings adjacent to one another are provided with an interval ¼ times or less smaller than the wavelength of a signal propagated through the first and second signal electrodes, wherein when a distance between the first signal electrode and the second signal electrode is expressed as L1 and each of a distance between the first signal electrode and the first ground electrode adjacent to the first signal electrode and a distance between the second signal electrode and the second ground electrode adjacent to second signal electrode is expressed as L2, a relationship of 2L1≤L2 is satisfied.

2. The semiconductor Mach-Zehnder optical modulator according to claim 1, wherein:

the connection wiring is comprised of any of:
a wire;

a back face ground electrode that is provided in a back face of the semiconductor substrate and that is connected to the first and second ground electrodes via first and second vias connected to the first and second ground electrodes, respectively; and an upper face ground electrode that is provided in an upper face of the semiconductor substrate and that is connected to the first and second ground electrodes via the first and second vias connected to the first and second ground electrodes, respectively.

3. The semiconductor Mach-Zehnder optical modulator according to claim 1, wherein the first and second phase modulation electrodes have, at the lower side thereof, the first and second arm waveguides.

4. The semiconductor Mach-Zehnder optical modulator according to claim 3, wherein a part of the first and second arm waveguides in which the first and second arm waveguides do not have thereon the first and second phase modulation electrodes has a configuration in which the non-doped semiconductor core layer has thereon a nondoped semiconductor clad layer.

5. The semiconductor Mach-Zehnder optical modulator according to claim 1, wherein one of the first conductive semiconductor clad layer and the second conductive semiconductor clad layer is comprised of a n-type semiconductor and the other is comprised of a p-type semiconductor.

6. The semiconductor Mach-Zehnder optical modulator according to claim 1, wherein:

the first conductive semiconductor clad layer and the second conductive semiconductor clad layer are both comprised of a n-type semiconductor and the waveguide structure has a configuration in which:

a third conductive semiconductor clad layer comprised of a p-type semiconductor is further formed between the non-doped semiconductor core layer and the first conductive semiconductor clad layer or between the non-doped semiconductor core layer and the second conductive semiconductor clad layer.

7. The semiconductor Mach-Zehnder optical modulator according to claim 1, wherein at least a part of the non-doped semiconductor core layer has a multiple quantum well layer structure.

8. A polarization multiplexing IQ modulator configured by parallelly arranging four of the semiconductor Mach-Zehnder optical modulators according to claim 1.

* * * * *